April 5, 1949.  L. T. SCHULER  2,466,045
PLEXIGLAS SHAPING MACHINE
Filed Nov. 20, 1946
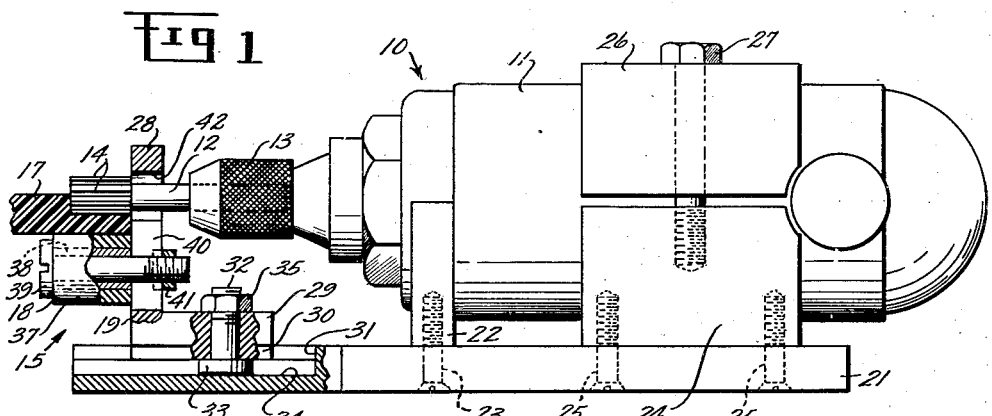
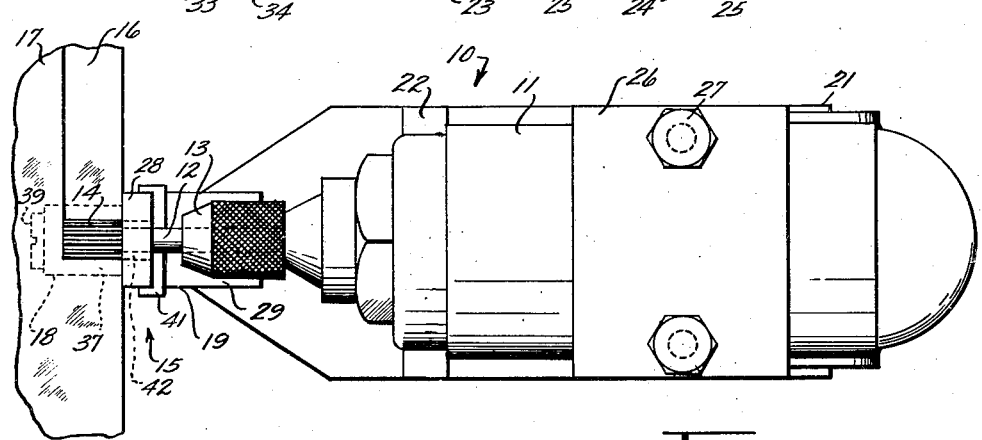
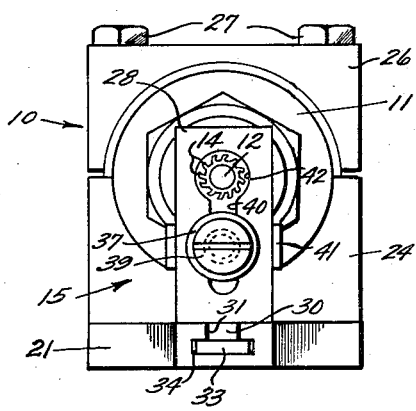
INVENTOR.
LEO T. SCHULER
BY Wade Koouty
J. Daniel Stuve
HIS ATTORNEYS Patented Apr. 5, 1949

2,466,045

UNITED STATES PATENT OFFICE 2,466,045

PLEXIGLAS SHAPING MACHINE

Leo T. Schuler, Cedar Rapids, Iowa

Application November 20, 1946, Serial No. 711,078

3 Claims. (Cl. 90—12)

(Granted under the act of March 3, 1883, as amended April 30, 1928; 370 O. G. 757)

The invention described herein may be manufactured and used by or for the Government for governmental purposes without payment to me of any royalty thereon.

This invention relates to a shaping or routing machine, and more particularly to a machine for routing the edge of Plexiglas where fastening strips are to be placed.

Heretofore, the edge routing of Plexiglas was generally accomplished by free-hand and with the use of an airmotor, which was tiresome and also inaccurate and resulted in spoiling a good deal of the work. In properly equipped shops and depots, such edge routing was also done by the use of cumbersome and costly machines. In either case, the setup for routing Plexiglas required an extra length of time, usually necessitating the making of a particular jig for each piece differently curved or shaped.

An essential object of this invention is to provide an efficient and accurately operating routing or shaping machine which is inexpensive and light, so as to be readily obtainable, easily transportable and also quickly adjustable for use, and which is especially well adapted for routing the edge of Plexiglas where the fastening strips are to be placed.

Another object of this invention is to provide such a routing machine which can be rapidly set up and adjusted, and the work can be quickly done on a Plexiglas routing job, in a fraction of the time heretofore required with the formerly known and used methods and the expensive and complicated machines, in order to effect considerable saving in time and labor.

Another object of this invention is to provide a compact shaper which is light in weight and small in size and is entirely capable of replacing the previously used costly machines in routing Plexiglas, so as to be well adapted for overseas work.

These and various other objects and advantages are attained with this invention as will become apparent from the following description, taken in connection with the accompanying drawing wherein the invention is shown in its preferred form, it being evident that other arrangements and forms of construction may be resorted to in carrying out the objects and purposes of this invention.

In the drawing:

Fig. 1 is a side elevational view of this invention, parts being broken away.

Fig. 2 is a plan view thereof.

Fig. 3 is an end view taken from the routing end of the machine.

This compact and light routing machine, which is more particularly adapted for routing or shaping Plexiglas, comprises a routing unit 10 which includes power means or a driving device 11 that is mounted operatively in a fixed position, and this device is preferably in the form of a light motor as an air operated motor. Said unit further includes a routing or shaping element 12, which is removably mounted on said device and is driven thereby. This element is preferably mounted in the chuck 13 of the motor, so as to be readily replaceable by another routing element that is best suited for the particular job, and it is in the form of a rotary cutter having a plurality of cutting edges or blades 14 around its peripheral surface.

A cutter having six to ten cutting edges or blades thereon is quite suitable for this work, and when rotated at approximately 7,000 R. P. M. will produce very favorable results. A high routing speed is preferable, so that each blade takes a very light cut, and the higher the speed, the smoother the cut.

A work supporting unit 15 is provided in this machine, and it is mounted so as to be adjustable relative to the routing unit 10, in order to place the work or article which is to be routed into its proper position relative to the routing element, for effecting the desired depth and width of the rout or step 16 that is being cut along the edge of the sheet of material or piece of work 17. This supporting unit 15 preferably includes a movable member 18 whereby the work is supported and whereupon it travels during operation, and bracket means or supporting means 19 whereon said movable member 18 is adjustably mounted and which itself is mounted so as to be adjustable relative to the routing unit 10.

These two units 10 and 15 are mounted and arranged so that one is adjustable relative to the other, and this adjustable arrangement, as disclosed herein, is provided by mounting the supporting unit 15 adjustably relative to the routing unit 10 held stationary. This is preferably accomplished by the use of a support in the form of a baseplate 21, having the motor 11 mounted stationary on said plate, as by a front block or saddle 22 secured on plate 21 by bolts 23 and engaging the forward part of the motor, and by clasping means including a lower block or saddle 24 secured by bolts 25 upon said plate 21, and an upper block 26 secured by bolts 27 onto said block 24, thereby clasping the motor between said blocks and retaining it in position on the baseplate 21. In this adjustable arrangement the bracket means 19 includes an upright arm or bar 28 having a lower angle bar or foot 29 thereon which rests on the baseplate 21 and which includes a depending flange or toe 30 engaged in a channel 31 provided in said plate 21. A bolt 32 has its head 33 slidably seated in a pair of grooves 34 provided on the two opposite sides of the bottom of said channel 31, said bolt extending from the channel through a bore in said foot 29, while the nut 35 on the bolt serves to secure the bracket means in place. This channel 31 and the toe 30 therein provide cooperating guide means between the bracket 19 and the plate 21, and these together with the securing bolt 32 provide a convenient adjustment of the supporting unit 15 toward and away from the routing unit 10, whereby to adjust the machine for providing the selected width of the rout.

The work supporting member 18 is preferably in the form of a roller 37 which is rotatively mounted upon a bushing 38 held on a bolt 39 which extends through a slot 40 provided in said arm 28 of bracket 19, this bolt being threaded in a clamping chuck 41 having bent ends and clasping the arm 28.

The routing element 12 extends through an enlarged aperture 42 provided at the upper part of slot 40, and said element projects above the work supporting roller 37, so that the edge part of the work or article 17, like a strip or sheet of Plexiglas, may be supported on said roller and moved thereover, directly beneath said routing element, to have the selected step or rout 16 cut upon said edge part, according to the particular shape and size desired.

With this economical construction, by adjusting the roller 37 up or down on arm 28, toward or away from the routing element 12, the depth or thickness of the rout may be readily adjusted; and similarly, by adjusting the bracket member 19 along said guide means 30, 31, toward or away from the driving motor 11, the width of the rout may be likewise adjusted, thereby providing the desired dimensions of the rout. Herein the small routing element 12 can also be readily removed from the chuck 13 and replaced by one of the required shape and size to provide the particular form of rout desired.

This improved routing machine thus provides an inexpensive and compact mechanism which is economically constructed, so that it can be readily obtained and used for overseas duties and can replace the former complex and costly machines, and which is at the same time readily adjusted and operated for the various types of routing desired on Plexiglas and the like.

I claim:

1. A routing machine, for routing the edge of a sheet of material, which consists of an elongated base, a motor secured to said base at one end thereof, a motor shaft for said motor extending longitudinally of said base, a chuck carried on said motor shaft, a routing cutter removably held in said chuck, an angle bracket at the other end of said base having a foot portion resting on said base and a vertical portion extending upwardly at right angles to said foot portion, said vertical portion having an opening through which said routing cutter extends, a guide portion formed on the underside of the foot of said angle bracket and a cooperating guide portion formed in said base and extending longitudinally thereof for adjusting said angle bracket on said base axially with respect to said cutter, a bolt extending through the base of said angle bracket and through said guide portions to lock said angle bracket on said base in the longitudinally adjusted position, a guide-roller bearing-stud supported in a vertical slot in the vertically extending portion of said bracket and in the same vertical plane as the motor shaft and below said motor shaft, a nut on the end of said stud for securing said stud in a selected vertical position, and a guide roller rotatable on said stud.

2. A routing machine, for routing the edge of a sheet of material, which consists of a base, a motor secured to said base, a motor shaft for said motor, a chuck carried on said motor shaft, a routing cutter removably held in said chuck, an angle bracket on said base having a foot portion resting on said base and a vertical portion extending upwardly at right angles to said foot portion, said vertical portion having an opening through which said routing cutter extends, a guide portion formed on the underside of the foot of said angle bracket and a cooperating guide portion formed in said base for adjusting said angle bracket on said base axially with respect to said cutter, means extending through the base of said angle bracket and through said guide to lock said angle bracket on said base in the axially adjusted position, a guide-roller bearing-stud supported in a vertical slot in the vertically extending portion of said bracket and in the same vertical plane as the motor shaft and below said motor shaft, a nut on the end of said stud for securing said stud in a selected vertical position, and a guide roller rotatable on said stud.

3. A routing machine, for routing a sheet of material, which consists of a base, a motor secured to said base, a motor shaft, a routing cutter removably secured to said motor shaft to rotate therewith, a bracket on said base having an opening through which said routing cutter extends, a guide on said bracket and a cooperating guide on said base for adjusting said bracket on said base axially with respect to said cutter, means to lock said angle bracket on said base in the axially adjusted position, a guide-roller bearing-stud having its axis parallel with the motor shaft, carried on said bracket, means to adjust said bearing stud axis toward or away from the axis of the motor shaft, and a guide roller rotatable on said stud.

LEO T. SCHULER.

REFERENCES CITED

The following references are of record in the file of this patent:

UNITED STATES PATENTS

| Number | Name | Date |
|---|---|---|
| 1,277,891 | Evans | Sept. 3, 1918 |
| 2,140,120 | Tomarin | Dec. 13, 1938 |